E. M. UTTERBACK.
WHEEL SCRAPER.
APPLICATION FILED SEPT. 3, 1913.
1,105,469.
Patented July 28, 1914.
2 SHEETS—SHEET 1.
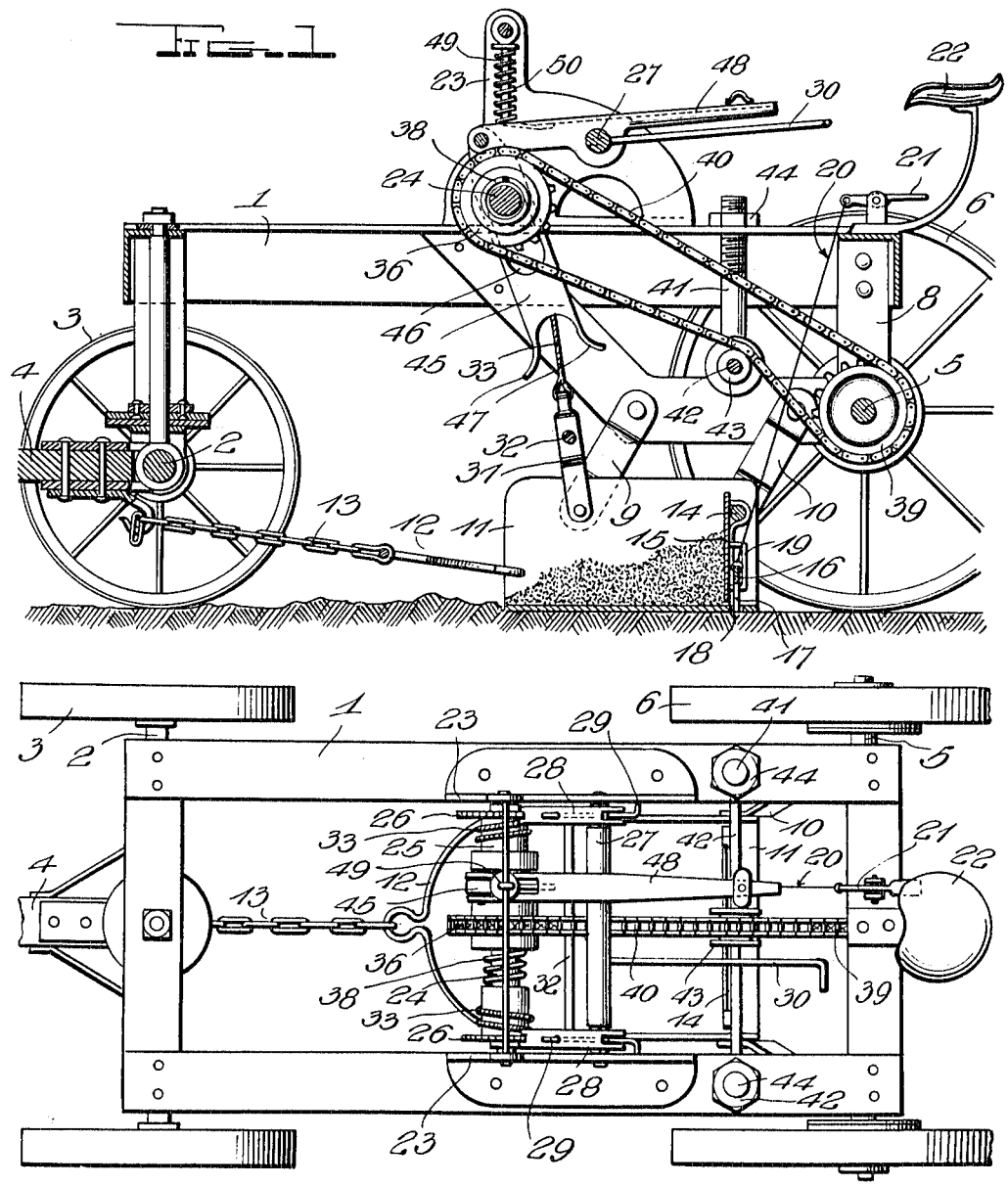
WITNESSES:
INVENTOR.
Ezra M. Utterback.
BY
William D. Deane
his ATTORNEY.

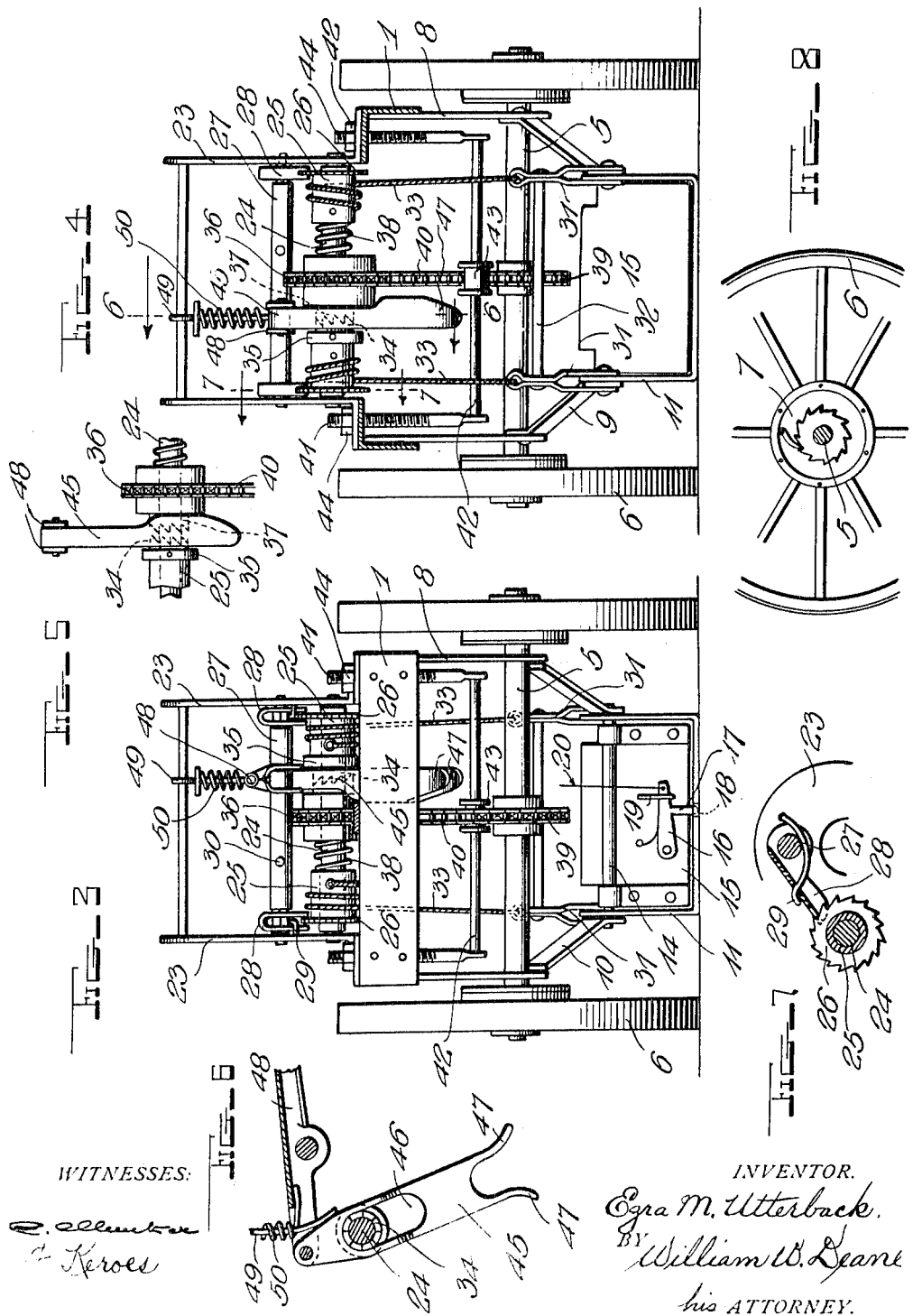

UNITED STATES PATENT OFFICE.

EZRA M. UTTERBACK, OF MACKSBURG, IOWA.

WHEEL-SCRAPER.

1,105,469.　　　　Specification of Letters Patent.　　Patented July 28, 1914.

Application filed September 3, 1913. Serial No. 787,937.

*To all whom it may concern:*

Be it known that I, EZRA M. UTTERBACK, a natural-born citizen of the United States, residing at Macksburg, in the county of Madison and State of Iowa, have invented certain new and useful Improvements in Wheel-Scrapers, of which the following is a specification.

This invention has relation to wheel scrapers, and it consists in the novel features hereinafter described and claimed.

An object of the invention is to provide a scraper of the character indicated comprising a wheel mounted frame with a pan attached thereto. Means is provided for raising the pan from the power exerted by the draft animals in moving the machine over the ground. Furthermore, means is provided for causing the pan to make a deep or shallow cut in the ground as desired. Means is provided for holding the pan in an elevated position whereby the machine may be freely transported or moved from point to point, and the pan is provided at its rear side with a pivoted gate and a gravity actuated latch adapted to retain the contents in the pan. However, when the said gate is raised the material may pass from the pan to the surface of the ground.

With these and other objects in view, the invention consists in certain novel features of construction as hereinafter shown and described, and then particularly pointed out in the claims and in the drawings illustrative of the preferred embodiment of the invention.

Figure 1 is a vertical longitudinal sectional view of the scraper. Fig. 2 is a top plan view of the same. Fig. 3 is a rear end elevation of the same. Fig. 4 is a transverse sectional view of the same. Fig. 5 is a detail view in elevation of a clutch mechanism used upon the scraper. Fig. 6 is a detailed sectional view of parts cut on the line 6—6 of Fig. 4. Fig. 7 is a similar view cut on the line 7—7 of the same figure. Fig. 8 is a detailed view in elevation with parts in section of an escapement device provided upon the scraper.

Corresponding and like parts are referred to in the following description and indicated in all the views of the accompanying drawings by the same reference characters.

The scraper comprises a frame 1, the forward end of which is supported upon a pivoted axle 2. Wheels 3 are journaled at the ends of the axle 2 and a tongue 4 is connected in any suitable manner with the intermediate portion of the said axle 2. In practice, the tongue 4 is preferably of a flexible or resilient nature in order that it may flex or bend when the scraper is in use and thereby prevent threshing or swaying as is usual when such tongues are made from rigid or stiff material. An axle 5 is journaled for rotation at the rear portion of the frame 1 and wheels 6 are mounted upon the ends of the axle 5. The usual ratchet escapement devices 7 are mounted at the centers of the wheels 6 and are adapted to engage the axle 5 when the wheels 6 turn in a forward direction to escape the said axle when the wheels turn in a rear direction. As these ratchet devices are common expedients in agricultural machines, it is thought that further description of the same in this specification is unnecessary. Brackets 8 depend from intermediate and rear side portions of the frame 1. Forward links 9 are pivoted at their upper ends to the forward portions of the brackets 8 and rear links 10 are pivoted at their upper ends to the rear portions of the said brackets. The lower end of the links 9 and 10 are pivotally connected with the opposite sides of a pan scoop 11. A bail 12 is pivotally connected with the forward end of the pan 11 and a chain 13 connects the said bail with the tongue 4. By lengthening or shortening the chain 13, the pan 11 may be caused to cut deep or shallow in the ground as desired. A rod 14 extends transversely across the rear portion of the pan 11 and its ends serve as the pivot means for connection between the lower ends of the rear links 10 and the sides of the said pan. A gate 15 is hingedly or pivotally mounted upon the rod 14 and when in a vertical position is adapted to close the rear end of the pan 11. A latch 16 is pivoted upon the gate 15 at the rear side thereof and is provided with a downwardly disposed lip 17 which is adapted to enter an opening or socket 18 provided in the pan 11 while the gate 15 is held in a closed position at the rear of the said pan. A guide 19 is mounted upon the gate 15 and receives the free end portion of the latch 16 whereby the swinging movement of the said latch is limited. A flexible member 20 is connected at one end with the free end of the latch 16 and at its other end is connected with a foot lever or treadle 21 mounted upon the frame 1 in the vicinity of the operator's seat 22. Therefore it will be seen that when the operator places his foot upon the treadle 21 and depresses the same, the flexible member 20 is moved longitudinally whereby the free end of the latch 16 is swung vertically and the lip 17 is lifted out of the opening 18. Therefore the gate 15 is free to swing and the contents of the pan 11 may gravitate from the same at the rear edge thereof under the said gate 15. After the pan 11 has been dumped of its contents as above described the gate 15 swings back by gravity to a vertical position and the operator releases pressure from the treadle 21 whereby the latch 16 twirls and the lip 17 thereof engages in the opening 18 and the parts are secured in closed position.

Standards 23 are mounted upon the intermediate portions of the side members of the frame 1 and a shaft 24 is journaled in the said standards. Winding drums 25 are mounted upon the ends of the shaft 24 adjacent the inner sides of the standards 23 and carry at their outer ends ratchet wheels 26. A shaft 27 is also journaled in the standards 23 and is provided with pawls 28 adapted to engage the ratchet wheel 26. Springs 29 are connected at one end with the standards 23 and at their other ends with the pawls 28 and serve to hold the said pawls toward the ratchet wheels 26. An arm 30 is fixed to the shaft 27 and extends back to the vicinity of the seat 22. When an operator places his foot upon the rear end of the arm 30 and depresses the same, the shaft 27 is turned whereby the pawls 28 are lifted out of engagement with the teeth of the ratchet wheels 26 and therefore the shaft 24 is rendered free to rotate. Clips 31 are pivotally connected to the upper forward portions of the side of the pan 11 and a rod 32 connects the said clips together and holds them at proper distances apart. Cables 33 are connected at their lower ends with the upper ends of the clips 31 and the upper ends of the cables 33 are arranged to wind upon the drums 25. A clutch member 34 is fixed to the intermediate portion of the shaft 24 and is provided with an annular collar 35. A sprocket wheel 36 is loosely journaled upon the shaft 24 and is provided with a clutch hub 37. A spring 38 is interposed between one of the drums 25 and the hub of the sprocket wheel 36 and is under tension with a tendency to hold the hub of the said sprocket wheel toward the clutch member 34. A sprocket wheel 39 is fixed to the intermediate portion of the axle 5 and a sprocket chain 40 is trained around the sprockets 36 and 39 and is adapted to transmit rotary movement from the rear axle 5 to the sprocket wheel 36. Standards 41 depend from the intermediate portions of the side members of the frame 1 and carry at their lower ends a shaft 42 upon which is journaled a roller 43. This roller lies under the lower run of the sprocket chain 40. Nuts 44 are screw-threaded upon the upper ends of the standards 41 and bear at their lower faces against the upper surfaces of the side members of the frame 1. Therefore it will be seen that by adjusting the nuts 44 the standards 41 may be moved vertically whereby the rollers 43 may be moved toward or away from the lower run of the sprocket chain 40 and thus means is provided for taking up any slack in the said chain 40 and also for maintaining the chain at a desired tension.

A member 45 is provided with an elongated slot 46 which receives the intermediate portion of the shaft 24. The said member 45 is located between the collar 35 of the clutch member 34 and the clutch hub 37 of the sprocket wheel 36. The member 45 gradually increases in transverse breadth below and toward the lower end of the slot 46, so that when the upper end of the said slot is against the shaft 24, the spring 38 may force the clutch hub 37 into engagement with the clutch member 34. When however, the member 45 is elevated so that the lower end of the slot 46 is in engagement with the shaft 24 or approximately so, the broader portion of the member 45 is interposed between the clutch hub 37 and the clutch member 34 whereby the said clutch hub 37 is forced away from the said clutch hub and out of engagement with the same. The lower end of the member 45 lies in the path of movement of the intermediate portion of the rod 32 and the said member 45 is provided at its lower end with diverging fingers 47 which are adapted to receive the rod 32 between them. Thus, when the pan 11 is raised and the rod 32 is brought into engagement with the upper end of the member 45 the said rod 32 lifts the member 45 whereby the said member automatically moves the clutch hub 37 out of engagement with the clutch member and the lifting movement of the pan 1 is interrupted. At this time the pawls 28 engage the teeth of the ratchet wheel 26 and prevent the cable 33 from unwinding from drums 25 until the said drums have been released as hereinbefore described.

A lever 48 is fulcrumed upon the shaft 27 and extends back to within convenient reach of the operator's seat 22. The forward end of the lever 48 is pivotally connected with the upper end of the member 45. A cross rod 49 is connected at its ends with the upper ends of the standards 23 and a coil spring 50 is interposed between the said rod and the forward end of the lever 38 and under tension with a tendency to hold the forward end of the said lever in a downward position. Therefore it will be seen that when an operator places his foot on the rear end of the lever 48 and lowers the same the forward end of the said lever is raised whereby the member 45 is lifted and the clutch hub 37 is moved away from the clutch member 34 as hereinbefore described. In view of the above description, it will be seen that a scraper of simple and durable arrangement is provided and that the scraper may be readily and easily loaded and when so loaded may be moved to any desired point where the load may be easily and quickly deposited.

Having described the invention what I claim as new, is:—

1. A machine of the character described, comprising a frame, traction wheels to support the same, a normally approximately horizontal scoop arranged below the frame, links pivotally connected with the rear portion of the scoop and with the frame, elements pivotally connected with the forward end of the scoop, a transverse rod connecting the elements, a transverse shaft mounted upon the frame near and above the elements, drums carried by the transverse shaft, cables attached to the elements and the drums to be wound thereabout, driving connecting means between the traction wheels and the transverse shaft, clutch mechanism for controlling the operation of the transverse shaft by the driving connecting means, and a depending reciprocatory member operating the clutch mechanism and having its lower end forked to receive the transverse rod therein whereby the same moves the member to operate the clutch mechanism.

2. A machine of the character described, comprising a wheeled frame, a normally approximately horizontal scoop arranged below the frame, means pivotally connecting the scoop with the frame, a transverse rotatable shaft connected with the frame and arranged above the scoop, operative connecting means between the transverse rotatable shaft and the scoop for elevating the scoop upon the rotation of the shaft, a clutch member rigidly mounted upon the transverse rotatable shaft, a spring pressed coacting clutch member rotatably mounted upon the transverse shaft and adapted to engage and disengage the first named clutch member, driving means for the second named clutch member, a reciprocatory shifting member provided near its upper end with a longitudinal slot for receiving portions of the clutch members, adapted to disengage the clutch members upon its upward movement, and having its lower end forked, a rearwardly extending manually operated lever disposed above the reciprocatory shifting member and pivotally connected therewith, spring means to urge the forward end of the lever downwardly, and an element connected with the scoop and adapted to engage within the lower forked end of the shifting member to automatically move the same.

In testimony whereof I affix my signature in presence of two witnesses.

EZRA M. UTTERBACK.

Witnesses:
CHARLES CLUTE,
BURT REDICK.